(12) United States Patent
Pratt et al.

(10) Patent No.: US 11,002,367 B2
(45) Date of Patent: *May 11, 2021

(54) VALVE SYSTEM

(71) Applicant: EXTENSIVE ENERGY TECHNOLOGIES PARTNERSHIP, Calgary (CA)

(72) Inventors: F. Dale Pratt, Calgary (CA); Kenneth A. Lambe, Calgary (CA)

(73) Assignee: EXTENSIVE ENERGY TECHNOLOGIES PARTNERSHIP, Calgary (CA)

( * ) Notice: Subject to any disclaimer, the term of this patent is extended or adjusted under 35 U.S.C. 154(b) by 97 days.

This patent is subject to a terminal disclaimer.

(21) Appl. No.: 16/402,841

(22) Filed: May 3, 2019

(65) Prior Publication Data

US 2019/0257173 A1 Aug. 22, 2019

Related U.S. Application Data

(62) Division of application No. 15/349,655, filed on Nov. 11, 2016, now Pat. No. 10,323,481.

(Continued)

(51) Int. Cl.
*E21B 34/06* (2006.01)
*F16K 3/26* (2006.01)
(Continued)

(52) U.S. Cl.
CPC ............ *F16K 3/265* (2013.01); *E21B 34/066* (2013.01); *E21B 43/26* (2013.01); *E21B 47/18* (2013.01);
(Continued)

(58) Field of Classification Search
CPC .... E21B 34/066; E21B 2200/06; F16K 3/262; F16K 3/265; F16K 31/0668; F16K 31/082
(Continued)

(56) References Cited

U.S. PATENT DOCUMENTS 3,094,307 A * 6/1963 Alley ...................... E21B 34/14
251/297
4,161,215 A * 7/1979 Bourne, Jr. ........... E21B 34/066
166/53

(Continued)

OTHER PUBLICATIONS http://www.halliburton.com/en-US/ps/completions/well-completions/horizontal-completions/frac-sleeve-systems.page?node-id=hxd31vg4.

(Continued)

*Primary Examiner* — Seth W. Mackay-Smith
(74) *Attorney, Agent, or Firm* — Heslin Rothenberg Farley & Mesiti P.C.; Victor A. Cardona, Esq.

(57) ABSTRACT

A valve is provided which is based on a stationary sleeve. The stationary sleeve includes at least one coil in communication with an electrical power source and one or more openings in the body of the stationary sleeve open to the hollow interior of the stationary sleeve. The valve has a microcontroller configured to control flow of electrical current independently to the coil and an inner sleeve configured to fit within the stationary sleeve. The inner sleeve has an internal or external magnetized portion and one or more ports open to the hollow interior of the inner sleeve. The inner sleeve is moveable within the stationary sleeve under power provided by a magnetic field generated by the electrical current passing through the coil to either align the ports with the openings to open the valve or to remove alignment of the ports with the openings to close the valve.

15 Claims, 2 Drawing Sheets

Related U.S. Application Data

(60) Provisional application No. 62/253,796, filed on Nov. 11, 2015, provisional application No. 62/258,093, filed on Nov. 20, 2015.

(51) Int. Cl.

| | | |
|---|---|---|
| *F16K 31/06* | (2006.01) | |
| *F16K 31/08* | (2006.01) | |
| *E21B 43/26* | (2006.01) | |
| *E21B 47/18* | (2012.01) | |
| *E21B 47/07* | (2012.01) | |
| *E21B 47/06* | (2012.01) | |

(52) U.S. Cl.
CPC .......... *F16K 3/262* (2013.01); *F16K 31/0668* (2013.01); *F16K 31/082* (2013.01); *E21B 47/06* (2013.01); *E21B 47/07* (2020.05); *E21B 2200/06* (2020.05)

(58) Field of Classification Search
USPC ................. 251/129.04, 129.1, 129.21, 344
See application file for complete search history.

(56) References Cited

U.S. PATENT DOCUMENTS

| | | | | |
|---|---|---|---|---|
| 4,191,248 | A * | 3/1980 | Huebsch | E21B 34/066 166/66.7 |
| 4,429,747 | A * | 2/1984 | Williamson, Jr. | E21B 34/14 166/321 |
| 4,579,177 | A * | 4/1986 | Going, III | E21B 34/14 166/66.5 |
| 4,649,993 | A * | 3/1987 | Going, III | E21B 34/066 166/66.6 |
| 4,679,766 | A | 7/1987 | Cuming | |
| 5,070,944 | A * | 12/1991 | Hopper | E21B 34/066 166/66.7 |
| 5,226,491 | A * | 7/1993 | Pringle | E21B 33/1295 166/66.7 |
| 6,112,809 | A | 9/2000 | Angle | |
| 6,817,416 | B2 * | 11/2004 | Wilson | E21B 34/06 166/332.1 |
| 6,988,556 | B2 * | 1/2006 | Vick, Jr. | F16K 31/086 166/375 |
| 7,252,152 | B2 * | 8/2007 | LoGiudice | E21B 41/00 166/386 |
| 7,503,398 | B2 | 3/2009 | LoGiudice et al. | |
| 7,640,989 | B2 * | 1/2010 | Williamson, Jr. | E21B 34/066 166/332.8 |
| 8,006,952 | B2 * | 8/2011 | Wygnanski | H02K 7/06 251/129.11 |
| 8,272,443 | B2 * | 9/2012 | Watson | E21B 47/117 166/318 |
| 8,662,178 | B2 * | 3/2014 | Norrid | E21B 34/102 166/318 |
| 8,757,265 | B1 * | 6/2014 | Cuffe | E21B 33/14 166/308.1 |
| 8,978,750 | B2 * | 3/2015 | Noske | E21B 34/063 166/66.6 |
| 9,051,810 | B1 * | 6/2015 | Cuffe | E21B 43/26 |
| 9,284,817 | B2 * | 3/2016 | Walton | E21B 34/102 |
| 9,611,718 | B1 * | 4/2017 | Bond | E21B 34/00 |
| 9,683,424 | B2 * | 6/2017 | Eleven | E21B 34/10 |
| 9,920,620 | B2 * | 3/2018 | Murphree | E21B 34/14 |
| 10,087,711 | B2 * | 10/2018 | Sargent | E21B 34/14 |
| 2004/0060697 | A1 * | 4/2004 | Tilton | E21B 47/09 166/253.1 |
| 2006/0075892 | A1 | 4/2006 | Dorr | |
| 2006/0237959 | A1 | 10/2006 | Dimig | |
| 2007/0285275 | A1 | 12/2007 | Purkis et al. | |
| 2008/0115575 | A1 | 5/2008 | Meek | |
| 2010/0012872 | A1 * | 1/2010 | Hartwell | F16K 3/26 251/129.15 |
| 2011/0198096 | A1 * | 8/2011 | Mailand | E21B 43/26 166/373 |
| 2015/0027706 | A1 * | 1/2015 | Symms | E21B 33/146 166/289 |
| 2016/0273308 | A1 * | 9/2016 | Williamson, Jr. | E21B 34/14 |

OTHER PUBLICATIONS www.slb.com/mss—Falcon Hydraulic-Actuated Frac Valve.
www.slb.com/mss—Schlumberger Falcon Multistage Simulation System.

\* cited by examiner

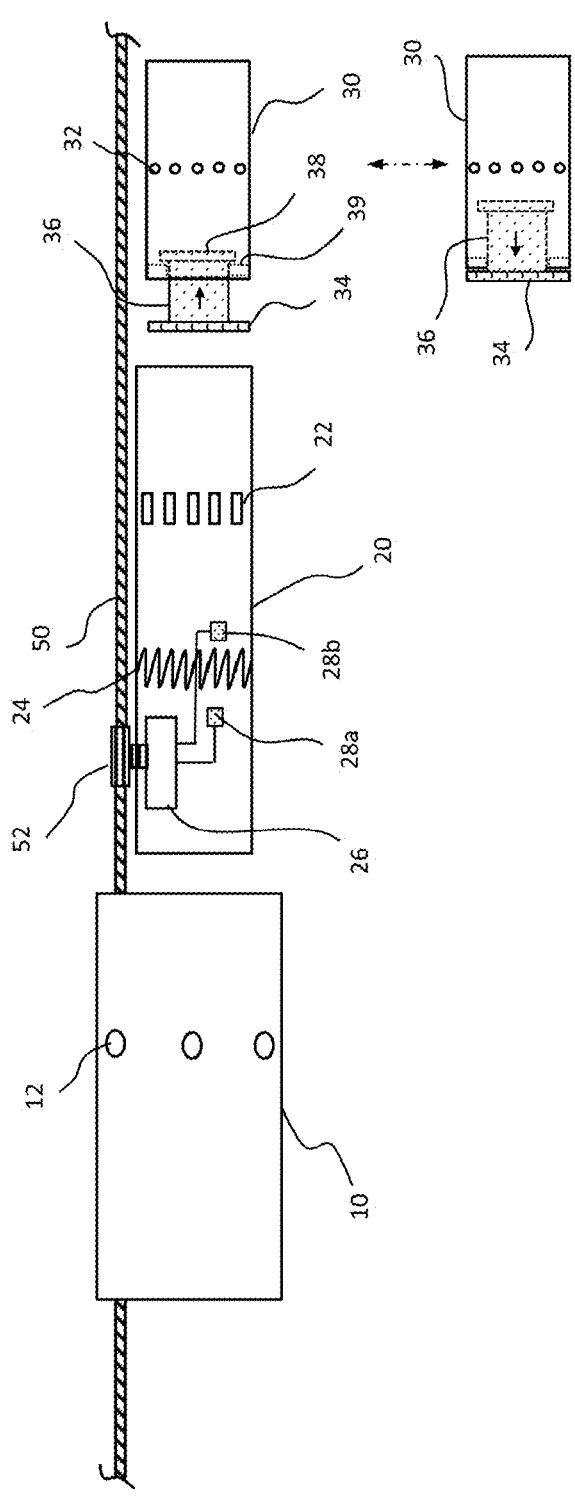
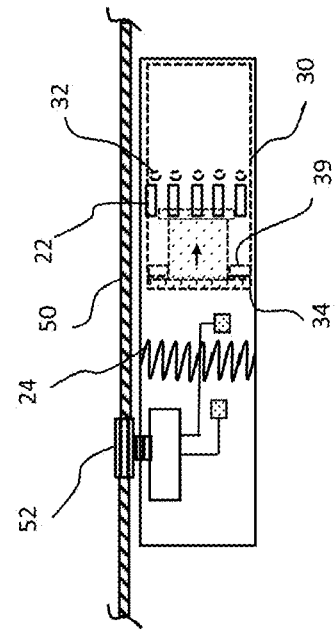
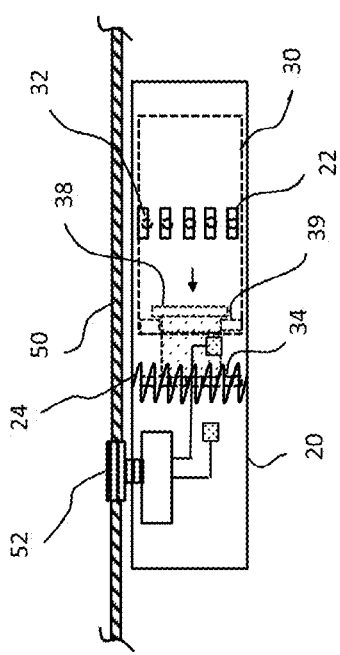
Fig. 1A
Fig. 1B
Fig. 1C

VALVE SYSTEM

CROSS-REFERENCE TO RELATED APPLICATIONS

This application is a divisional of U.S. patent application Ser. No. 15/349,655 filed on Nov. 11, 2016, which claims priority to U.S. Provisional Patent Application Ser. No. 62/253,796 filed on Nov. 11, 2015, and U.S. Provisional Patent Application Ser. No. 62/258,093 filed on Nov. 20, 2015, the entire disclosures of which are incorporated herein by reference.

FIELD OF THE INVENTION

The invention relates to valves used in oil and gas wells and, more particularly to improved valves powered by a direct power line to a surface power source. The valves are particularly suited for use as fracturing valves or valves for controlling production from different sections of a hydrocarbon formation or in downhole telemetry systems for generating fluid pulses encoding data obtained from downhole sensors.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer, and thus, the porous layer forms a reservoir in which hydrocarbons are able to collect. A well is drilled through the earth until the hydrocarbon bearing formation is reached. Hydrocarbons then are able to flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit and carry cuttings from the drilling process back to the surface. As the drilling progresses downward, the drill string is extended by adding more pipe sections.

When the drill bit has reached the desired depth, larger diameter pipes, or casings, are placed in the well and cemented in place to prevent the sides of the borehole from caving in. Cement is introduced through a work string. As it flows out the bottom of the work string, fluids already in the well, so-called "returns," are displaced up the annulus between the casing and the borehole and are collected at the surface.

Once the casing is cemented in place, it is perforated at the level of the oil bearing formation to create openings through which oil can enter the cased well. Production tubing, valves, and other equipment are installed in the well so that the hydrocarbons may flow in a controlled manner from the formation, into the cased well bore, and through the production tubing up to the surface for storage or transport.

This simplified drilling and completion process, however, is rarely possible in the real world. Hydrocarbon bearing formations may be quite deep or otherwise difficult to access. Thus, many wells today are drilled in stages. An initial section is drilled, cased, and cemented. Drilling then proceeds with a somewhat smaller well bore which is lined with somewhat smaller casings or "liners." The liner is suspended from the original or "host" casing by an anchor or "hanger." A seal also is typically established between the liner and the casing and, like the original casing, the liner is cemented in the well. That process then may be repeated to further extend the well and install additional liners. In essence, then, a modern oil well typically includes a number of tubes wholly or partially within other tubes.

Moreover, hydrocarbons are not always able to flow easily from a formation to a well. Some subsurface formations, such as sandstone, are very porous. Hydrocarbons are able to flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and increasing production from formations which are relatively nonporous.

One technique involves drilling a well in a more or less horizontal direction, so that the borehole extends along a formation instead of passing through it. More of the formation is exposed to the borehole, and the average distance hydrocarbons must flow to reach the well is decreased. Another technique involves creating fractures in a formation which will allow hydrocarbons to flow more easily. Indeed, the combination of horizontal drilling and fracturing, (also known as "fracing" or "frac'ing" (in the industry) or "fracking" (in the mainstream media) is presently the only commercially viable way of producing natural gas from the vast majority of North American gas reserves.

Fracturing typically involves installing a production liner in the portion of the well bore which passes through the hydrocarbon bearing formation. In shallow wells, the production liner may actually be the casing suspended from the well surface. In either event, the production liner is provided, by various methods discussed below, with openings at predetermined locations along its length. Fluid, most commonly water, then is pumped into the well and forced into the formation at high pressure and flow rates, causing the formation to fracture and creating flow paths to the well. Proppants, such as grains of sand, ceramic or other particulates, usually are added to the fracturing fluid and are carried into the fractures. The proppant serves to prevent fractures from closing when pumping is stopped.

A formation usually is fractured at various locations, and rarely, if ever, is fractured all at once. Especially in a typical horizontal well, the formation usually is fractured at a number of different points along the bore in a series of operations or stages. For example, an initial stage may fracture the formation near the bottom of a well. The frac job then would be completed by conducting additional fracturing stages in succession up the well.

Some operators prefer to perform a fracturing operation on an "open hole," that is without cementing the production liner in the well bore. The production liner is provided with a series of packers and is run into an open well bore. The packers then are installed to provide seals between the production liner and the sides of the well bore. The packers are spaced along the production liner at appropriate distances to isolate the various fracturing zones from each other. The zones then may be fractured in a predetermined sequence. The packers in theory prevent fluid introduced through the liner in a particular zone from flowing up or down the well bore to fracture the formation in areas outside the intended zone.

Certain problems arise, however, when an open hole is fractured. The distance between packers may be substantial, and the formation is exposed to fluid pressure along that entire distance. Thus, there is less control over the location at which fracturing of a formation will occur. It will occur at the weakest point in the fracturing zone, i.e., the portion of the well bore between adjacent packers. Greater control may be obtained by increasing the number of packers and diminishing their separation, but that increases the time required to complete the fracturing operation. Moreover, even if packers are tightly spaced, given the extreme pressures required to fracture some formations and the rough and sometimes frangible surface of a well bore, it may be difficult to achieve an effective seal with a packer. Thus, fluid may flow across a packer and fracture a formation in areas outside the intended zone.

In part for such reasons, many operators prefer to cement the production liner in the well bore before the formation is fractured. Cement is circulated into the annulus between the production liner and well bore and is allowed to harden before the fracturing operation is commenced. Thus, fracturing fluid first penetrates the cement in the immediate vicinity of the inner openings before entering and fracturing the formation. The cement above and below the liner openings serves to isolate other parts of the formation from fluid pressure and flow. Thus, it is possible to control more precisely the location at which a formation is fractured when the production liner is first cemented in the well bore. Cementing the production liner also tends to more reliably isolate a producing formation than does installing packers. Packers seat against a relatively small portion of the well bore, and even if an effective seal is established initially, packers may deteriorate as time passes.

There are various methods by which a production liner is provided with the openings through which fracturing fluids enter a formation. In a "plug and perf" fracturing job, the production liner is made up from standard lengths of casing. The liner does not have any openings through its sidewalls. It is installed in the well bore, either in an open bore using packers or by cementing the liner, and holes then are punched in the liner walls. The perforations typically are created by so-called perforation guns which discharge shaped charges through the liner and, if present, adjacent cement.

The production liner typically is perforated first in a zone near the bottom of the well. Fluids then are pumped into the well to fracture the formation in the vicinity of the perforations. After the initial zone is fractured, a plug is installed in the liner at a point above the fractured zone to isolate the lower portion of the liner. The liner then is perforated above the plug in a second zone, and the second zone is fractured. That process is repeated until all zones in the well are fractured.

The "plug and perf" method is widely practiced, but it has a number of drawbacks. One major drawback is that it can be extremely time consuming. The perforation guns and plugs must be run into the well and operated individually, often times at great distance and with some difficulty. After the fracturing job is complete, it also may be necessary to drill out or otherwise remove the plugs to allow production of hydrocarbons through the liner. Thus, many operators prefer to fracture a formation using a series of fracturing valves.

Such fracturing valves typically include a cylindrical housing that may be threaded into and forms a part of a production liner. The housing defines a central conduit through which fracturing fluids and other well fluids may flow. Ports are provided in the housing that may be opened by actuating a sliding sleeve. Once opened, fluids are able to flow through the ports and fracture a formation in the vicinity of the valve.

The sliding sleeves in such valves traditionally have been actuated either by creating hydraulic pressure behind the sleeve or by dropping a ball on a ball seat which is connected to the sleeve. Typical multi-stage fracturing systems will incorporate both types of valves. Halliburton's RapidSuite sleeve system and Schlumberger's Falcon series sleeves, for example, utilize a hydraulically actuated "initiator" valve and a series of ball-drop valves.

More particularly, the production liner in those systems is a hydraulically actuated sliding sleeve valve which, when the liner is run into the well, will be located near the bottom of the well bore in the first fracture zone. The production liner also includes a series of ball drop valves which will be positioned in the various other fracture zones extending uphole from the first zone.

A fracturing job will be initiated by increasing fluid pressure in the production liner. The increasing pressure will actuate the sleeve in the bottom, hydraulic valve, opening the ports and allowing fluid to flow into the first fracture zone. Once the first zone is fractured, a ball is dropped into the well and allowed to settle on the ball seat of the ball-drop valve immediately uphole of the first zone. The seated ball isolates the lower portion of the production liner and prevents the flow of additional fracturing fluid into the first zone. Continued pumping will shift the seat downward, along with the sliding sleeve, opening the ports and allowing fluid to flow into the second fracture zone. The process then is repeated with each ball-drop valve up hole from the second zone until all zones in the formation are fractured.

Such systems have been used successfully in a number of well completions. The series of valves avoids the time consuming process of running and setting perforation guns and plugs. Instead, a series of balls are dropped into the well to successively open the valves and isolate downhole zones. It may still be necessary, however, to drill out the liner to remove the balls and seats prior to production. Unlike "plug and perf" jobs, there also is a practical limit to the number of stages or zones that can be fractured.

That is, the seat on each valve must be big enough to allow passage of the balls required to actuate every valve below it. Conversely, the ball used to actuate a particular valve must be smaller than the balls used to actuate every valve above it. Given the size constraints of even the largest production liners, only so many different ball and seat sizes may be accommodated. Halliburton's RapidStage ball-drop valves, for example, only allow up to twenty intervals to be completed. While that capability is not insignificant, operators may prefer to perform an even greater number of stages using a single liner installation.

Sliding sleeves which are controlled using radio frequency identification (RFID) technology have been proposed for use in frac valves, and various RFID controlled sliding sleeve valves have been used in other well operations. For example, U.S. Patent Publication No. 20070285275 (incorporated herein by reference in entirety) discloses a circulation sub having a sliding sleeve valve which is used to control circulation through a drill string. As drilling progresses and drilling mud is circulated through a well, pressure imbalances can occur along the drill string that make it more difficult to sweep cuttings up to the surface. By incorporating various valves in the drill string, such issues may be addressed by selectively diverting fluid out of the drill string through the valves.

The circulation subs disclosed in U.S. Patent Publication No. 20070285275 generally comprise a cylindrical housing that may be threaded into a drill string. The housing has a central conduit through which drilling fluids are circulated. Ports are provided in the housing to allow fluid to be diverted from the central conduit into the well bore. A sleeve is mounted on the interior of the housing in a recess in the central conduit. The sleeve is actuated by pumping hydraulic fluid above a piston integrally formed in the sleeve. As fluid is pumped above the piston, the sleeve will slide away from and uncover the ports.

The hydraulic pump is controlled by a programmable electronic controller. The controller is connected to a RFID antenna which is adapted to pick up signals from encoded RFID transmitters passed through the drill string. When an operator wishes to open the sleeve in a particular valve, an "open valve" signal is encoded into an RFID transmitter. The signal is unique for that particular valve. When the RFID transmitter is pumped through the drill string and is detected by the corresponding valve, the pump is actuated to open the valve. Other valves in the drill string may be opened by circulating additional RFID transmitters through the drill string.

U.S. Pat. No. 7,252,152 to M. LoGiudice et al. and U.S. Pat. No. 7,503,398 to M. LoGiudice et al. (each of which is incorporated herein by reference in its entirety) disclose RFID-controlled sliding sleeve valves which are similar in many respects to the valves disclosed in U.S. Patent Publication No. 20070285275. The valves of U.S. Pat. Nos. 7,252,152 and 7,503,398 are disclosed for use as a casing circulation diverter tool, as part of a stage cementing apparatus, or for other unspecified downhole fluid flow regulating apparatus. Like the valves in U.S. Patent Publication No. 20070285275, the valves disclosed in U.S. Pat. Nos. 7,252,152 and 7,503,398 each have a sliding sleeve that is mounted on the interior of the tool housing in a recess in a central conduit. The valves have a programmable controller connected to an RFID antenna which can detect an encoded signal from a RFID tag passed through the conduit. The sleeve is actuated, however, by a linear actuator instead of the hydraulic pump provided in the valves of U.S. Patent Publication No. 20070285275.

Such RFID controlled sliding sleeve valves may have certain advantages in the context of the specific well operations for which they are intended. They do not rely on differing ball sizes to actuate the sleeves, and so a greater number of valves may be incorporated into a particular conduit. They are not well suited, however, for incorporation into a production liner and use in fracturing operations. Frac fluids typically include proppants, such as grains of sand, ceramic or other particulates, which can be quite abrasive and can interfere with the operation of sliding sleeve valves. Moreover, if the production liner will be cemented in place prior to fracturing the formation, cement passing through the valve conduit when the casing is cemented may hang up in the valve and interfere with subsequent operation of the sleeve.

U.S. Pat. No. 8,757,265 to Cuffe et al. (incorporated herein by reference in its entirety) discloses a fracturing valve which is actuated by means of a transmitter located within the housing conduit of the valve.

There remains a need for new and improved sliding sleeve valves and for new and improved methods for fracturing formations and for producing hydrocarbons from formations using sliding sleeve valves. Such disadvantages and others inherent in the prior art are addressed by various aspects and embodiments of the subject invention.

SUMMARY OF THE INVENTION

One aspect of the present invention is a downhole valve configured for direct electrical surface control via a conducting cable, the valve comprising:
a. a stationary sleeve configured for connection to a production string or a downhole tool, the stationary sleeve including:
i. at least one coil connected to an electrical power source at surface via the conducting cable; and
ii. one or more slots in the body of the stationary sleeve open to the hollow interior of the stationary sleeve;
b. a microcontroller connected to the conducting cable and configured to control the flow of electrical power independently to the coil; and
c. an inner sleeve configured to fit within the stationary sleeve, the inner sleeve having an internal or external magnetized portion and one or more ports open to the hollow interior of the inner sleeve, the inner sleeve moveable within the stationary sleeve under power provided by a magnetic field generated by electrical current passing through the coil to either align the ports with the slots to open the valve or to remove alignment of the ports with the slots to close the valve.

In some embodiments, the valve further comprises a capacitor connected between the microcontroller and the coil, the capacitor provided to increase stored electrical energy for operation of the valve.

In some embodiments, the valve further comprises an H-bridge connected to the coil via the microcontroller for providing forward or reverse polarity to the coil to drive operation of the valve.

In some embodiments, the cable includes six conductors and wherein two conductors of the six conductors are configured to provide power to the coil, two other conductors of the six conductors are configured for connection to a CAN bus and the two remaining conductors of the six conductors are configured for connection to one or more flow or temperature sensors.

In some embodiments, the valve further comprises a pair of Hall sensors for sensing the position of the magnetized portion of the inner sleeve, the Hall sensors connected to the microcontroller for providing inner sleeve position information to an operator at surface.

In some embodiments, the valve further comprises an outer sleeve configured to hold the stationary sleeve, the outer sleeve having one or more openings open to the hollow interior of the outer sleeve, the outer sleeve configured for insertion within a production string.

In some embodiments, the valve further comprises a magnet sleeve configured to slide within the inner sleeve, wherein the magnetized portion is provided by one or more magnets located on an outwardly extending end of the magnet sleeve, wherein the magnet sleeve provides a force amplification mechanism for movement of the inner sleeve during opening and closing of the valve.

In some embodiments, movement of the magnet sleeve towards the coil is limited by a ridge on the end of the magnet sleeve opposite the outwardly extending end, wherein the ridge prevents the magnet sleeve from completely exiting the inner sleeve by contact with a retaining ring located inside the cavity of the inner sleeve.

Another embodiment of the invention is a fracturing system configured for deployment in a well drilled for a series of fracturing operations, the system comprising a string of production tubing having installed therein a series of valves as described herein, wherein each one of the valves of the system is powered by the conducting cable which is connected to each of the valves via a junction.

Another embodiment of the invention is a hydrocarbon production system configured for permanent deployment in a well, the system comprising a string of production tubing having installed therein a series of valves as described herein, wherein each one of the valves of the system is powered by the conducting cable which is connected to each of the valves via a junction.

Another embodiment of the invention is a hydrocarbon production system configured for temporary deployment in a well, the system comprising a retrievable downhole tool having installed therein a series of valves as described herein, wherein each one of the valves of the system is powered by the conducting cable which is connected to each of the valves via a junction.

Another embodiment of the invention is a downhole telemetry system for transmission of data generated by one or more downhole sensors to the surface, the system comprising:
  d. a series of valves as recited herein, in data communication with the downhole sensors for generation of pulses of fluid encoding the data; and
  e. a data decoding processor at the surface for analyzing the pulses and decoding the data.

In some embodiments of the downhole telemetry system, the data provides information about hydrocarbon production rates or information about fracturing operations.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 1A is a schematic exploded view of a valve according to one embodiment of the invention.

FIG. 1B is a schematic view of the same valve of FIG. 1A shown in the open position with slots 22 aligned with the ports 32.

FIG. 1C is a schematic view of the same valve of FIGS. 1A and 1B shown in the closed position, wherein the ports 32 are no longer aligned with the slots 32.

DETAILED DESCRIPTION OF THE INVENTION

Rationale

Figure 2:
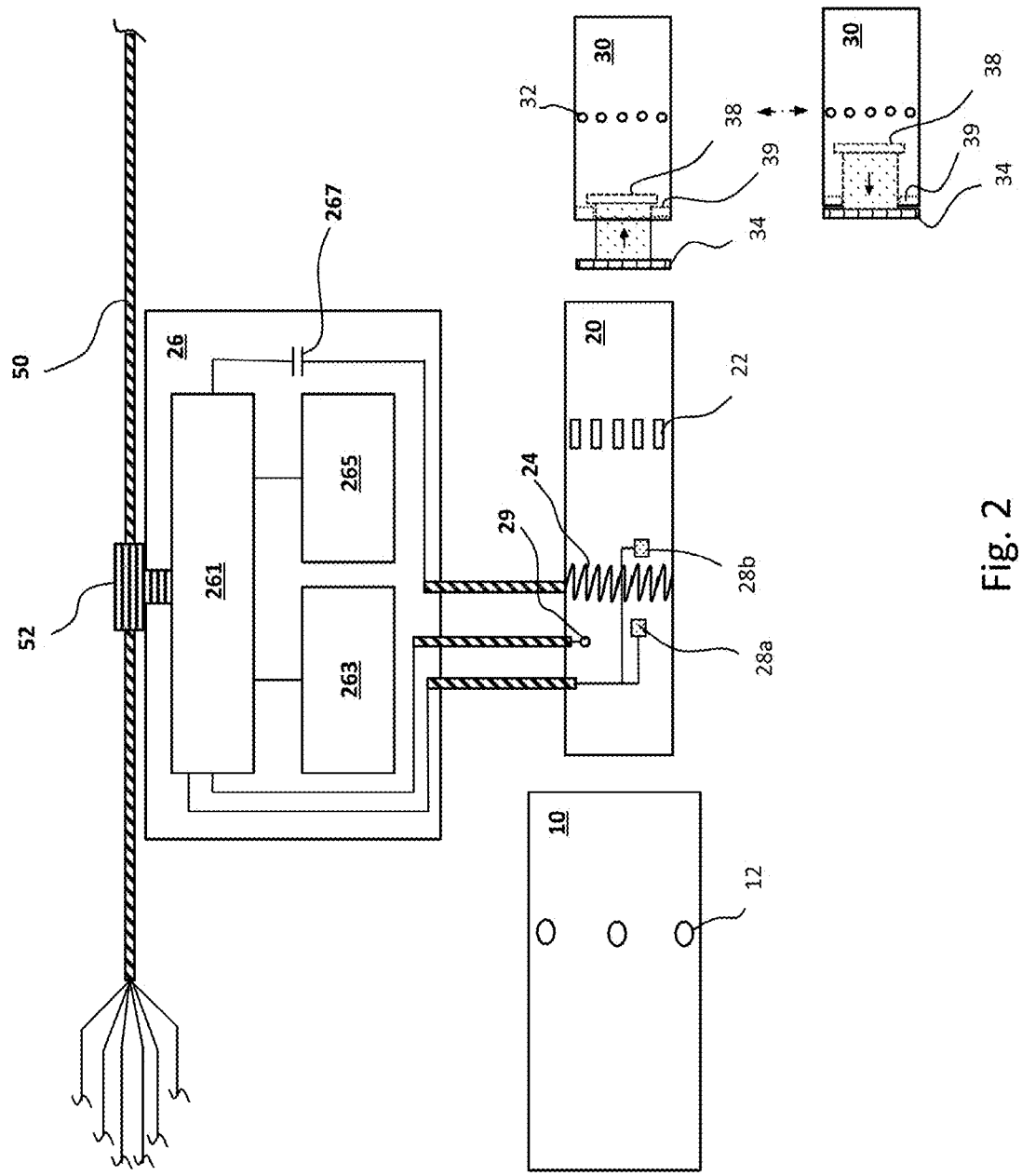
FIG. 2 is a schematic view of the same valve of FIGS. 1A to 1C with more detail shown of control box 26.

There is a need for remotely operating downhole valves situated in a permanently installed oilfield production casing or in a temporarily installed downhole tool. It is desirable to have control of such downhole valves to open and close them before and after fracturing operations or in situations where it is desired to produce hydrocarbons via entry of hydrocarbons into production casing via one such valve while an adjacent downhole valve is closed. One requirement is to have one or more valves open while others remain closed to isolate different sections of the well at different times to equalize oil flow from different sections of the drilled well.

It is desirable to reduce problems with the valves closest to the surface having the least path of resistance for the oil to flow out of the formation to equalize the production from other valves. The valves allow for the endmost valves to be open before other valves in succession or remain closed in case of a water or gas producing zone.

For example, a typical completion well consists of about 20 mechanical fracturing valves which are "opened once" using different sized balls which are pumped from surface which engage only with a respective size mating receiver downhole to operate a specific valve from the closed position. The problem with this is the valve can only be opened, and a mechanical wireline device would be required from surface to close a valve which is costly, time consuming, and there would be no positive feedback to indicate if the operation was successful.

Embodiments described herein are adaptable to a permanent installation or a temporary installation in a downhole tool which allows the operators to repeatably and confidently open and close any downhole valve, thereby providing an unlimited number of operations. This is particularly advantageous because re-fracturing of pre-existing fractured wells is now recognized as an effective means for producing hydrocarbons.

Embodiments of the present invention avoid the problems associated with using electromagnetic signals or seismic signals to open and close downhole valves. In addition, the valves are relatively simple to manufacture at low cost.

Overview of Features and Operation of One Embodiment

The valve operates using direct electrical power provided by a direct conducting cable line with sufficient sheathing to withstand the high pressures of fracturing liquids used in a typical fracturing operation. In one particular embodiment, an Inconel or Stainless steel sheathed high pressure 6-conductor cable strapped along the outside of the production casing is one of the key components. The cable is pressure protected to 20,000 psi and provides power, bidirectional communications flow measurement, and feedback to any number of downhole valves.

The cable is connects to each valve control box and is serially connected to the next valve in the casing. The cable is fed through a protective channel or protective cover to avoid damage during initial high pressure fracturing operations.

In one embodiment, the actuator used to open and close the valve is a custom manufactured hollow bidirectional magnetic sleeve and coil assembly housed inside a casing to move a slotted slide valve back and forth to provide fluid access from the annulus to the casing bore or restrict the fluid access. The sleeve is hollow to allow flow to pass through the bore of the sleeve. The magnetic assembly consists of one or more permanent magnets attached to one end of the sliding hollow sleeve located in an outer housing. The outer housing includes a coil of wire wound to provide an opposing magnetic field to act on a permanent magnet to move the sliding sleeve forward and backward to provide an open or closed position to fluid access to the casing annulus.

In alternative embodiments, a small linear actuator and brushless DC Motor (BLDC) is used to operate the valve in a similar fashion.

In one embodiment, the valve actuator includes an H-bridge circuit to provide a forward or reverse polarity to the coil. The H-bridge is controlled via a microcontroller. The microcontroller is responsible for functions including but not limited to providing a unique serial number to each valve, control logic, PWM and timing functions, flow calculations, communications, and power control.

A transceiver is used for secure bidirectional communications to surface via the conducting cable. In one embodiment, these communications are provided via a CANBUS connection.

Hall sensors or magnetic proximity sensors provide feedback to determine valve position. Current pulsed through the coil is alternatively used to determine valve position.

Another aspect of the invention is a fracturing system with a series of valves as described above. Each valve in the series has a unique serial number, and can be operated independent of the other valves in the series. Alternatively, a global command can be sent to operate any specific combination of valves.

Power is supplied from a surface-based power supply and each valve has capacitance to provide capacity to power each control circuitry as well as stored energy to operate the valve. The capacitors are arranged in parallel with respect to each valve to increase stored energy availability downhole.

At the surface, a higher voltage power supply provides power to downhole devices as required. The long line lengths provide resistance to slowly charge the downhole capacitors.

An HMI or PC interface is provided at the surface for display and communications to the downhole devices, providing capability to query all valves for their status and operate each valve to an open, closed or intermediate position.

The system may be energized continually or on exception to operate any number of valves and the HMI can be used on any number of wells with a portable system. In certain embodiments, the system network is connected to a supervisory control and data acquisition (SCADA) system for remote monitoring and control as required.

In certain embodiments, the spare set of wires in the 6 conductor cable are used for flow measurement using a reference and sampling probe to evaluate low flow condition or as an auxiliary function.

Description of an Example Downhole Valve Embodiment

One embodiment of the valve of the invention will now be described with reference to the Figures. Alternative features are described during the course of description of this particular embodiment. The skilled person will recognize that various alternative features are combinable to produce a number of different embodiments when individual elements of combinations are compatible as readily recognized by the skilled person. Such embodiments are also within the scope of the invention as defined by the appended claims. For the purposes of illustration, components depicted in the figures are not necessarily drawn to scale. Instead, emphasis is placed on highlighting the various contributions of the components to the functionality of various aspects of the invention.

Referring now to FIGS. 1 and 2, there is shown an exploded view of a valve according to one embodiment of the invention. It is to be understood that in this particular embodiment, the valve is configured for insertion into a line of production tubing in a manner similar to the arrangement disclosed in U.S. Pat. No. 8,757,265 (incorporated herein by reference in its entirety). However, alternative embodiments are incorporated into downhole tools for temporary installation. Such alternative embodiments are readily constructed by a person with ordinary skill in the art without undue experimentation.

The valve of the present embodiment includes an outer sleeve 10 configured for threading attachment at both ends to production tubing or adapters configured for threading attachment to production tubing in a permanent installation. In the embodiment shown, the conducting cable 50 which provides power and other functions to the valve, passes through the hollow body of the outer sleeve 10. The outer sleeve 10 is defined by having a series of openings 12 which allow communication of fluids out of the valve and into the hydrocarbon formation, and vice versa during the hydrocarbon production phase. The cable 50 includes a junction 52 for connection to the valve.

The middle sleeve 20 fits inside the outer sleeve 10 and has a series of slots 22 formed therein and communicating with its hollow interior. This middle sleeve is fixed in place within the hollow interior of the outer sleeve 10 using packers and/or other conventional components used in the art for fixing downhole tools in place. There is a coil shown generally at 24 wrapped around the exterior of the middle sleeve 20 (alternative embodiments have a pair of coils on the middle sleeve 20 to switch the position of a magnet). Also shown is a control box 26 which is covered with a protective enclosure (not shown, to preserve clarity) formed of material such as Inconel or stainless steel to protect the components contained therewithin from contact with high pressure fluid during a fracturing operation. One of the components residing within the protective enclosure is a microcontroller 261 (see FIG. 2). The microcontroller 261 receives all six of the conductors from the cable 50 via the junction 52 and controls electrical power and signal processing. Two conducting lines provide a connection from the microcontroller 261 to a pair of Hall sensors 28a and 28b which are also located on the outside of the middle sleeve 20. The function of the Hall sensors 28a and 28b is to sense the position of the magnet 34, thereby consistently indicating the state of the valve as open or closed (or partially open or partially closed).

The inner sleeve 30 of the valve is defined by the presence of a series of ports 32. In the embodiment shown, there is a magnet sleeve 36 configured to slide within the left side of the cavity of the inner sleeve 30 and partially out of the left side opening (alternative embodiments have a magnetized portion located circumferentially around the outer sidewall or against the inner sidewall of the outer sleeve 30 instead of being located on a separate sliding magnet sleeve 36). Leftward sliding movement of the magnet sleeve 36 is halted by a ridge 38 on the magnet sleeve 36 being blocked by a retaining ring 39 inside the inner sidewall of the cavity of the inner sleeve 30 (see upper drawing of the inner sleeve 30 in FIG. 1A) and rightward sliding movement is halted by the body of the magnet 34 encountering the edges of the left opening of the inner sleeve 30 when the magnet sleeve 36 moves into the cavity of the inner sleeve 30 (see lower drawing of the inner sleeve 30 in FIG. 1A).

The sliding movement of the magnet sleeve 36 (demonstrated by arrows in FIG. 1A) amplifies the driving force provided by the electromagnetic mechanism based on the coil 24 and the magnet 34. As such, the combination of the inner sleeve 30 and the magnet sleeve 36 provides a force-amplifying "slide hammer" mechanism. This mechanism helps to move the inner sleeve 30 so that it moves within the middle sleeve 20 more effectively. Another advantage provided by this mechanism is the ability to quickly toggle the movement of the inner sleeve 30 to free it if it becomes stuck or if its movement becomes impaired.

FIG. 1B shows the valve in the open position, which allows communication of fluid and/or gas from the production tubing to the formation and vice versa via the openings 12 of the outer sleeve 10 (shown in FIG. 1A). It is seen that the ports 32 of the inner sleeve 30 are aligned with the slots 22 of the intermediate sleeve 20 when the magnet 34 is aligned with the coil 24. It is also seen in FIG. 1B that the magnet sleeve 36 is extended outward from the inner sleeve 30 with its ridge 38 against the retaining ring 39.

FIG. 1C shows the valve in the closed position, wherein the ports 32 are no longer aligned with the slots 22 and instead are located to the right of the slots 22 when the magnet 34 is driven away from the coil 24 upon switching of the polarity at the H-bridge 265 (shown in FIG. 2). Returning to FIG. 1C, it is seen that the magnet 34 is no longer aligned with the coil 24 and is now instead located to the right of the coil 24. In this arrangement, the magnet sleeve 36 is retracted within the cavity of the inner sleeve 30 and the magnet 34 is located at the left opening of the magnet sleeve 36.

The valve is actuated by switching the polarity of the coil 24. When the coil 24 carries an electrical current, a magnetic field is generated and the magnet 34 of the outer sleeve moves accordingly to move the inner sleeve 30 resulting in either alignment of the slots 22 with the ports 32 to open the valve as shown in FIG. 1B or to remove the alignment of the slots 22 with the ports 32 to close the valve as shown in FIG. 1C, preventing communication of fluid and/or gas from the production tubing to the formation and vice versa. In certain embodiments, there is a continuum of partially open/closed conditions for the valve, or a series of discrete partially open/closed conditions. These options may be configured by the skilled person without undue experimentation. Specific settings of are selectable using the microcontroller under control by an operator at a workstation which is connected to the microcontroller via the conducting cable 50.

It is to be understood that while two valve positions are shown in FIGS. 1B and 1C, a range of partially open/closed positions may be provided to provide a means for controlling the flow of hydrocarbons or fracturing fluids.

FIG. 2 shows additional detail of the control box 26 and components contained therewithin. It is seen that the control box 26 also includes a CAN bus module 263 which is provided to ensure proper shielding of electronic signals controlling operation of the valve, and an H-bridge 265 which provides forward or reverse polarity to the coil 24. Also provided is a capacitor 267 whose purpose is to provide power to the control circuitry as well as stored energy for operation of the valve. It is believed that such stored energy may be needed if the cumulative resistance of thousands of meters of conducting cable causes a significant loss of the electrical current used for actuating the valve. This cumulative resistance will be harnessed to charge the capacitor. The cumulative resistance is overcome by using the capacitor to hold a reserve energy source.

Also shown in FIG. 2 is a sensor 29 for providing data relating to conditions within the valve, such as gas or liquid flow rate or temperature. The sensor 29 is connected to the microcontroller 261 and sends signal data to the surface via one of the conductors of the cable 50.

In one embodiment, the cable 50 includes six conductors with two conductors providing power for actuation of the valve, two conductors for operation of the CAN bus control network and two spare conductors which may be used for optional connection to two sensors.

Seals (not shown) are provided to keep foreign material out of the sleeve voids available for the travel. The voids are filled with oil and pressure-compensated to equalize pressure or provided with wiper seals to allow fluid into the void while preventing sand and other solids from entering the void, thereby allowing the inner sleeve to move unencumbered with respect to the stationary sleeve.

Fracturing System

Another aspect of the invention is a fracturing system configured for deployment in a well drilled for a series of fracturing operations. The system includes a string of production tubing having installed therein a series of fracturing valves of the invention, such as the embodiment described hereinabove. Each of the fracturing valves of the system is powered by the conducting cable which is connected to each of the fracturing valves via a junction.

Control of the valves is provided by an operator at a surface workstation networked to the conducting cable. Each of the valves is independently controllable by the operator. Therefore, the fracturing system may be operated as a permanent or semi-permanent installation where any section of a geological formation adjacent to the production string may be subjected to a fracturing operation in any order by opening one of the valves of the series. Fracturing operations may also be repeated in any order along the series of valves. This represents a significant advantage over existing fracturing systems.

Hydrocarbon Production System

Another aspect of the invention is a production system configured for temporary or permanent deployment in a well. The system includes at least one downhole tool having installed therein one or more valves of the invention, such as the embodiment described hereinabove. Each of the valves of the system is powered by the conducting cable which is connected to each of the fracturing valves via a junction.

Control of the valves is provided by an operator at a surface workstation networked to the conducting cable. Each of the valves is independently controllable by the operator. Therefore, the production system may be operated as a permanent installation if the valves are installed as part of the production tubing or temporary installation when installed in a retrievable downhole tool. One or more valves may be opened to allow production from one or more sections of a formation while other valves below are closed to prevent production. This represents a significant advantage over existing production systems.

Telemetry System for Transmission of Downhole Data to the Surface

Embodiments of the downhole valve described herein may be assembled in a telemetry system adapted for providing pressure pulses corresponding to data generated by downhole sensors in a manner similar to the conventional mud pulse telemetry systems used in drilling technologies. In the telemetry systems which use the valve described herein, a series of valves is provided in a tubing string or in a downhole tool. Pulses are generated by opening and closing valves in a particular sequence to encode data acquired by sensors. The data decoded from the pulses at the surface is used to obtain useful information about downhole pressures and production rates of a producing well or about fracturing operations. Such data may include, but is not limited to, pressure, flow rate and temperature. A person having ordinary skill in the art of downhole telemetry has the knowledge to adapt various embodiments of the downhole valve of the invention for a production or fracturing telemetry system without undue experimentation.

EQUIVALENTS AND SCOPE

Other than described herein, or unless otherwise expressly specified, all of the numerical ranges, amounts, values and percentages, such as those for amounts of materials, elemental contents, times and temperatures, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used).

The terms "one," "a," or "an" as used herein are intended to include "at least one" or "one or more," unless otherwise indicated.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs.

While this invention has been particularly shown and described with references to embodiments thereof, it will be understood by those skilled in the art that various changes in form and details may be made therein without departing from the scope of the invention

The invention claimed is:

1. A valve comprising:
   a) a stationary sleeve including:
      i) at least one coil in communication with an electrical power source; and
      ii) one or more openings in a body of the stationary sleeve open to the hollow interior of the stationary sleeve;
   b) a microcontroller configured to control flow of electrical current to the coil;
   c) an inner sleeve configured to fit within the stationary sleeve, the inner sleeve having one or more ports open to the hollow interior of the inner sleeve, the inner sleeve moveable within the stationary sleeve under power provided by a magnetic field generated by the electrical current passing through the coil to either align the ports with the openings to open the valve or to remove alignment of the ports with the openings to close the valve; and
   d) a magnet sleeve configured to slide within the inner sleeve, the magnet sleeve having a magnetized portion provided by one or more magnets located on an outwardly extending end of the magnet sleeve, wherein the magnet sleeve provides an impact force mechanism for movement of the inner sleeve during opening and closing of the valve.

2. The valve of claim 1, further comprising a capacitor connected between the microcontroller and the coil, the capacitor provided to increase stored electrical energy for operation of the valve.

3. The valve of claim 1, which is configured for direct electrical control via a conducting cable.

4. The valve of claim 3, wherein the cable includes six conductors and wherein two conductors of the six conductors are configured to provide power to the coil, two other conductors of the six conductors are configured for connection to a CAN bus and the two remaining conductors of the six conductors are configured for connection to one or more flow or temperature sensors.

5. The valve of claim 1, further comprising an outer sleeve configured to hold the stationary sleeve, the outer sleeve having one or more outer sleeve openings open to the hollow interior of the outer sleeve, the outer sleeve having ends configured for attachment to a conduit.

6. The valve of claim 1, wherein movement of the magnet sleeve towards the coil is limited by a ridge on the end of the magnet sleeve opposite the outwardly extending end, wherein the ridge prevents the magnet sleeve from completely exiting the inner sleeve by contact with a retaining ring located inside the cavity of the inner sleeve.

7. A valve configured for direct electrical control via a conducting cable, the valve comprising:
   a) a stationary sleeve including:
      i) at least one coil in communication with an electrical power source; and
      ii) one or more openings in a body of the stationary sleeve open to the hollow interior of the stationary sleeve;
   b) a microcontroller configured to control flow of electrical current to the coil;
   c) an inner sleeve configured to fit within the stationary sleeve, the inner sleeve having one or more ports open to the hollow interior of the inner sleeve, the inner sleeve moveable within the stationary sleeve under power provided by a magnetic field generated by the electrical current passing through the coil to either align the ports with the openings to open the valve or to remove alignment of the ports with the openings to close the valve;
   d) an H-bridge connected to the coil via the microcontroller for providing forward or reverse polarity to the coil to drive operation of the valve; and
   e) a magnet sleeve configured to slide within the inner sleeve, the magnet sleeve having a magnetized portion provided by one or more magnets located on an outwardly extending end of the magnet sleeve, wherein the magnet sleeve provides an impact force mechanism for movement of the inner sleeve during opening and closing of the valve.

8. The valve of claim 7, further comprising a capacitor connected between the microcontroller and the coil, the capacitor provided to increase stored electrical energy for operation of the valve.

9. The valve of claim 7, wherein the cable includes six conductors and wherein two conductors of the six conductors are configured to provide power to the coil, two other conductors of the six conductors are configured for connection to a CAN bus and the two remaining conductors of the six conductors are configured for connection to one or more flow or temperature sensors.

10. The valve of claim 7, further comprising a pair of Hall sensors for sensing the position of the magnetized portion of the inner sleeve, the Hall sensors connected to the microcontroller for providing inner sleeve position information to an operator.

11. The valve of claim 7, further comprising an outer sleeve configured to hold the stationary sleeve, the outer sleeve having one or more outer sleeve openings open to the hollow interior of the outer sleeve, the outer sleeve having ends configured for attachment to a conduit.

12. The valve of claim 7, wherein movement of the magnet sleeve towards the coil is limited by a ridge on the end of the magnet sleeve opposite the outwardly extending end, wherein the ridge prevents the magnet sleeve from completely exiting the inner sleeve by contact with a retaining ring located inside the cavity of the inner sleeve.

13. A valve configured for direct electrical control via a conducting cable, the valve comprising:
   a) a stationary sleeve including:
      i) at least one coil in communication with an electrical power source; and
      ii) one or more openings in a body of the stationary sleeve open to the hollow interior of the stationary sleeve;
   b) a microcontroller configured to control flow of electrical current to the coil;
   c) an inner sleeve configured to fit within the stationary sleeve, the inner sleeve having one or more ports open to the hollow interior of the inner sleeve, the inner sleeve moveable within the stationary sleeve under power provided by a magnetic field generated by the electrical current passing through the coil to either align the ports with the openings to open the valve or to remove alignment of the ports with the openings to close the valve;
   d) a pair of Hall sensors for sensing the position of the magnetized portion of the inner sleeve, the Hall sensors connected to the microcontroller for providing inner sleeve position information to an operator; and
   e) a magnet sleeve configured to slide within the inner sleeve, the magnet sleeve having a magnetized portion provided by one or more magnets located on an outwardly extending end of the magnet sleeve, wherein the magnet sleeve provides an impact force mechanism for movement of the inner sleeve during opening and closing of the valve.

14. The valve of claim 13, further comprising an outer sleeve configured to hold the stationary sleeve, the outer sleeve having one or more outer sleeve openings open to the hollow interior of the outer sleeve, the outer sleeve having ends configured for attachment to a conduit.

15. The valve of claim 13, wherein movement of the magnet sleeve towards the coil is limited by a ridge on the end of the magnet sleeve opposite the outwardly extending end, wherein the ridge prevents the magnet sleeve from completely exiting the inner sleeve by contact with a retaining ring located inside the cavity of the inner sleeve.

* * * * *